United States Patent
Hida

(10) Patent No.: US 11,305,820 B2
(45) Date of Patent: Apr. 19, 2022

(54) VEHICLE BODY SIDE STRUCTURE

(71) Applicant: HONDA MOTOR CO., LTD., Tokyo (JP)

(72) Inventor: Kazunori Hida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 16/839,092

(22) Filed: Apr. 3, 2020

(65) Prior Publication Data

US 2020/0331535 A1 Oct. 22, 2020

(30) Foreign Application Priority Data

Apr. 19, 2019 (JP) .............................. JP2019-080304

(51) Int. Cl.
*B62D 25/02* (2006.01)
*B62D 25/16* (2006.01)
*B62D 27/06* (2006.01)

(52) U.S. Cl.
CPC ........... *B62D 25/025* (2013.01); *B62D 25/16* (2013.01); *B62D 27/06* (2013.01)

(58) Field of Classification Search
CPC ....... B62D 27/06; B62D 25/16; B62D 25/025
See application file for complete search history.

(56) References Cited

U.S. PATENT DOCUMENTS

2005/0264042 A1* 12/2005 Abe ...................... B62D 25/025
296/203.01

FOREIGN PATENT DOCUMENTS

| CN | 107031731 | 8/2017 |
| CN | 107336748 | 11/2017 |
| CN | 109204576 | 1/2019 |
| JP | 2006-312358 | 11/2006 |
| JP | 4848911 | 12/2011 |
| JP | 5092777 | 12/2012 |
| JP | 2013119337 A * | 6/2013 |
| JP | 2014-101033 | 6/2014 |
| JP | 5846108 | 1/2016 |
| JP | 6435709 | 12/2018 |

OTHER PUBLICATIONS

Japanese Notice of Allowance for Japanese Patent Application No. 2019-080304 dated Jan. 5, 2021.
Chinese Office Action for Chinese Patent Application No. 202010209374.X dated Jan. 26, 2022.

* cited by examiner

*Primary Examiner* — D Glenn Dayoan
*Assistant Examiner* — Melissa Ann Bonifazi
(74) *Attorney, Agent, or Firm* — Amin, Turocy & Watson, LLP

(57) ABSTRACT

A vehicle body side structure includes a side sill stiffener, a wheel arch reinforcement member, an inner panel and a bulkhead. The side sill stiffener has a side sill stiffener extension section extending from a rear end portion of the side sill toward behind and above in the vehicle body. The wheel arch reinforcement member is coupled to the side sill stiffener extension section. The inner panel is coupled to the wheel arch reinforcement member and forms a first closed cross section. A first bulkhead is coupled to the side sill stiffener extension section and the wheel arch reinforcement member and partitions the first closed cross section.

9 Claims, 12 Drawing Sheets

VEHICLE BODY SIDE STRUCTURE

CROSS-REFERENCE TO RELATED APPLICATION

Priority is claimed on Japanese Patent Application No. 2019-080304, filed Apr. 19, 2019, the content of which is incorporated herein by reference.

BACKGROUND OF THE INVENTION

Field of the Invention

The present invention relates to a vehicle body side structure.

Description of Related Art

For a vehicle body side structure, a configuration in which a side sill is provided in a vehicle body forward/rearward direction, a wheel arch reinforcement member is coupled to a rear end portion of the side sill from behind and above, and thus, a frame member of a vehicle body is constituted by the side sill and the wheel arch reinforcement member is known. In the rear end portion of the side sill and the wheel arch reinforcement member, for example, a rear lower section of a door opening section is formed in a V shape. In addition, a coupling section to which the rear end portion of the side sill and the wheel arch reinforcement member are coupled corresponds to a corner section (a joint section) formed in a V shape (for example, see Japanese Unexamined Patent Application, First Publication No. 2006-312358).

SUMMARY OF THE INVENTION

Here, in a vehicle body side structure disclosed in Japanese Unexamined Patent Application, First Publication No. 2006-312358, a coupling section between a rear end portion of a side sill and a wheel arch reinforcement member corresponds to a corner section (a joint section). Accordingly, for example, when a load is input to a vehicle body due to a lateral collision, bending stress may be concentrated to the corner section due to the input load. As an example of a countermeasure therefor, it is conceivable to strongly couple the coupling sections through continuous welding, an increase in the number of welding points, combination with an adhesive agent, an increase in plate thickness, addition of a reinforcement member, or the like.

However, when the coupling sections are strongly coupled through continuous welding, an increase in the number of welding points, combination with an adhesive agent, an increase in plate thickness, addition of a reinforcement member, or the like, a configuration of coupling the coupling sections becomes complicated, which hinders a suppressing of an increase in vehicle body weight or hinders a reduction in manufacturing costs.

An aspect of the present invention is directed to providing a vehicle body side structure in which a side sill reinforcement member is able to be coupled strongly to a wheel arch reinforcement member using a simple configuration.

(1) A vehicle body side structure of the present invention includes a side sill stiffener having a side sill stiffener extension section extending upward at an end portion of a side sill; a wheel arch reinforcement member coupled to an upper end portion of the side sill stiffener extension section; an inner panel coupled to the wheel arch reinforcement member and configured to form a first closed cross section; and a bulkhead coupled to the side sill stiffener extension section and the wheel arch reinforcement member and configured to partition the first closed cross section.

In the aspect of the above-mentioned (1), the side sill stiffener extension section of the side sill stiffener is extended upward from the end portion of the side sill. That is, the side sill stiffener extension section provided integrally with the side sill stiffener can stand upward from the end portion of the side sill. The wheel arch reinforcement member is coupled to the upper end portion of the side sill stiffener extension section. Accordingly, the side sill stiffener extension section and the wheel arch reinforcement member can be coupled above the corner section of the door opening section (the vehicle body frame). In addition, the bulkhead is coupled to the side sill stiffener extension section and the wheel arch reinforcement member.

Accordingly, the portion in which the side sill stiffener extension section, the wheel arch reinforcement member and the bulkhead are coupled can be disposed above the corner section. That is, the portion in which the side sill stiffener extension section, the wheel arch reinforcement member and the bulkhead are coupled can be disposed at a place in which bending stress is relatively smaller than that of the corner section, for example, when a load is input to the vehicle body due to a lateral collision. For this reason, since there is no need to provide excessively strong coupling like in the related art, the coupling can be performed cheaply with little weight.

Further, the first closed cross section of the wheel arch reinforcement member (a substantially rectangular cross section that thins upward) is partitioned by the bulkhead. Accordingly, the cross-sectional shape can be held with respect to stress (in particular, bending stress) applied due to a lateral collision by the bulkhead that partitions the first closed cross section, and deformation (collapse, folding) of the wheel arch reinforcement member or the like that constitutes the first closed cross section can be minimized.

Accordingly, the side sill stiffener extension section of the side sill stiffener is extended, and peeling off (breaking) of the coupling sections can be contained by the bulkhead using a simple configuration in which the side sill stiffener extension section, the wheel arch reinforcement member and the bulkhead are coupled. As a result, the side sill stiffener and the wheel arch reinforcement member can be strongly coupled.

(2) In the aspect of the above-mentioned (1), the first closed cross section may be coupled so as to be continuous with a second closed cross section of the side sill constituted by the side sill stiffener and the inner panel.

In the aspect of the above-mentioned (2), since the second closed cross section of the side sill and the first closed cross section of the wheel arch reinforcement member are continuous with each other, the first closed cross section can be smoothly (fluently) connected to the second closed cross section. Accordingly, since the high strength high rigidity side sill frame (the second closed cross section) provided to endure the lateral collision load and the cross-sectional shape of the first closed cross section are continuous with each other, rigidity of the first closed cross section of the wheel arch reinforcement member (rigidity with respect to bending or twisting in the vehicle body forward/rearward direction) can be increased.

(3) In the aspect of the above-mentioned (1), the bulkhead may have: a first connecting section coupled to the wheel arch reinforcement member and the side sill stiffener extension section; a second connecting section coupled to the inner panel; and a wall section configured to connect the first connecting section and the second connecting section and having a bead extending toward the first connecting section and the second connecting section.

In the aspect of the above-mentioned (3), the first connecting section is coupled to the wheel arch reinforcement member and the side sill stiffener extension section, and the second connecting section is coupled to the inner panel. In addition, the first connecting section and the second connecting section are connected by the wall section, and the bead is formed on the wall section. Accordingly, rigidity of the wall section in the compression direction can be increased by the bead. Accordingly, when the bending stress (the bending in the vehicle body forward/rearward direction) is applied to the first closed cross section of the wheel arch reinforcement member, a load in the compression direction input into the wall section can be supported (i.e., through stiffness) by the wall section, and deformation (collapse, folding) of the first closed cross section of the wheel arch reinforcement member can be minimized.

In addition, since the first connecting section, the wall section and the second connecting section of the bulkhead are folded and bent on boundaries thereof, the bulkhead can be formed. Accordingly, since the bulkhead can be simply configured through folding and bending, productivity of the bulkhead can be improved.

(4) In the aspect of the above-mentioned (3), the vehicle body side structure may include a side panel outer member configured to cover the side sill stiffener from a side outward of a vehicle; a first fastening member provided in the side sill stiffener extension section on a side closer to the side panel outer member; and a second fastening member fastened to the first fastening member in the first closed cross section through an insertion hole formed in a portion of the inner panel corresponding to the first fastening member.

In the aspect of the above-mentioned (4), since the second fastening member is fastened to the first fastening member through the insertion hole of the inner panel, the first connecting section, the wheel arch reinforcement member and the side sill stiffener extension section can be coupled by the first fastening member and the second fastening member. Accordingly, for example, in an attachment process of a sub-frame or a suspension, which is a process after covering the side sill stiffener with the side panel outer member from a side outward from the vehicle, the first connecting section, the wheel arch reinforcement member and the side sill stiffener extension section can be coupled.

Meanwhile, when the first connecting section, the wheel arch reinforcement member and the side sill stiffener extension section are coupled through, for example, welding or adhesion, in a process before covering the side sill stiffener with the side panel outer member from an outward side in the vehicle, coupling by a welding machine or an adhesive agent coating machine is required.

On the other hand, in the structure of the application, the process of coupling the members using the welding machine or the adhesive agent coating machine can be omitted, and productivity can be improved.

(5) In the aspect of the above-mentioned (4), the vehicle body side structure may include a hole closing member configured to close the insertion hole.

In the aspect of the above-mentioned (5), since the hole closing member configured to close the insertion hole is provided, in a state in which the first connecting section, the wheel arch reinforcement member and the side sill stiffener extension section are coupled by the first fastening member and the second fastening member, the insertion hole can be closed by the hole closing member. As the hole closing member, for example, a grommet formed of a resin or rubber may be exemplified. Accordingly, entering of foreign substances such as water, gravel, or the like into the first closed cross section of the wheel arch reinforcement member from the insertion hole can be minimized, and further, for example, entering of sound or the like into the first closed cross section from the insertion hole can be minimized.

(6) In the aspect of the above-mentioned (1), a portion to which the side sill stiffener extension section and the wheel arch reinforcement member are fastened may be inclined in a vehicle width direction such that a first distance with respect to the inner panel at one of an outward side or an inward side of the portion to which the side sill stiffener extension section and the wheel arch reinforcement member are coupled in the vehicle width direction is greater than a second distance with respect to the inner panel at the other one of the outward side or the inward side of the portion to which the side sill stiffener extension section and the wheel arch reinforcement member are coupled in the vehicle width direction.

In the aspect of the above-mentioned (6), the portion in which the side sill stiffener extension section and the wheel arch reinforcement member are coupled is inclined with respect to the inner panel. Accordingly, a cavity between the inner panel and a tire or a cavity (a dead space) between the side sill stiffener extension section and the side panel outer member can be minimized in size. Accordingly, a large cross-sectional area (region) for the first closed cross section can be secured, and deformation (collapse, folding) of the first closed cross section (i.e., the wheel arch reinforcement member) can be minimized.

(7) In the aspect of the above-mentioned (4), the wall section may be provided below the insertion hole, and a cavity between the first closed cross section and the wall section may be set to be smaller than the second fastening member.

In the aspect of the above-mentioned (7), the wall section of the bulkhead is disposed below the insertion hole, and the cavity between the first closed cross section and the wall section is set to be smaller than the second fastening member. Accordingly, when the second fastening member is dropped in the first closed cross section, the wall section becomes a receiver, and productivity can be improved by preventing dropping of the second fastening member.

On the other hand, in the case in which the wall section is disposed above the insertion hole, when the second fastening member is dropped in the first closed cross section, the second fastening member drops to below the second closed cross section of the side sill. For this reason, it is difficult to pick up the second fastening member from below the second closed cross section of the side sill.

(8) In the aspect of the above-mentioned (4), the wall section may be provided below the insertion hole and is provided on the first connecting section at a side in which the first closed cross section has a larger region, and may include a foaming agent filled into the first closed cross section from the insertion hole.

In the aspect of the above-mentioned (8), the wall section is disposed below the insertion hole and at a side in which the first closed cross section has a larger region. Accordingly, when the first closed cross section is filled with the foaming agent from the insertion hole, the wall section can function as a partition plate. For this reason, for example, the first closed cross section having a small cross-sectional area is filled with the foaming agent, and the first closed cross section can be reinforced by the foaming agent.

Accordingly, since the filling direction of the foaming agent is oriented into the first closed cross section having a smaller cross-sectional area, there is no need to fill the closed cross section having a larger cross-sectional area with the foaming agent, and vehicle body vibrations can be reduced and productivity can be improved.

Further, for example, in the first closed cross section, since the second bulkhead is provided at a position spaced a fixed distance from the insertion hole, a region to be reinforced by the foaming agent can be restricted by the wall section of the second bulkhead.

(9) In the aspect of the above-mentioned (4), at a portion in which the side sill stiffener extension section and the wheel arch reinforcement member are coupled, the first connecting section, the wheel arch reinforcement member and the side sill stiffener extension section may be coupled by the first fastening member and the second fastening member in at least two places in the vehicle width direction.

In the aspect of the above-mentioned (9), the first connecting section, the wheel arch reinforcement member and the side sill stiffener extension section are coupled in at least two places in the vehicle width direction. Accordingly, the area in which the side sill stiffener extension section and the wheel arch reinforcement member are coupled can be more strongly coupled without increasing the overlapping between the side sill stiffener extension section and the wheel arch reinforcement member.

Further, since there is no need to increase the overlapping between the side sill stiffener extension section and the wheel arch reinforcement member, reduction in weight of the vehicle body can be achieved.

According to the vehicle body side structure of the present invention, the side sill stiffener extension section and the wheel arch reinforcement member are coupled above the corner section of the door opening section, and the bulkhead is coupled to the side sill stiffener extension section and the wheel arch reinforcement member. Accordingly, the side sill reinforcement member and the wheel arch reinforcement member can be strongly coupled using a simple configuration.

DETAILED DESCRIPTION OF THE INVENTION

Figure 1:
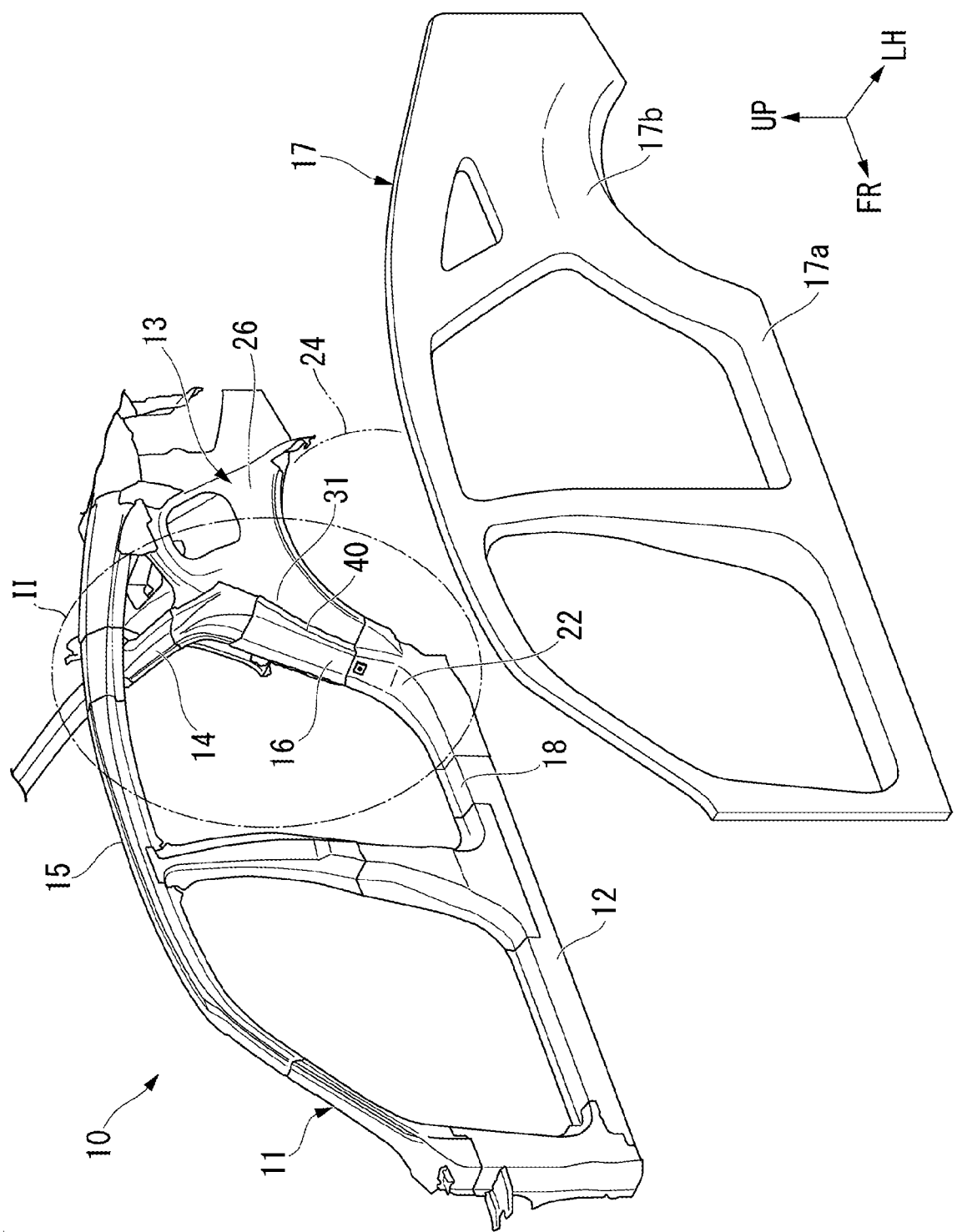
FIG. 1 is an exploded perspective view showing a vehicle body side structure of a first embodiment according to the present invention.

Hereinafter, a vehicle body side structure of an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle. The vehicle body side structure has a substantially laterally symmetrical configuration, and hereinafter, a configuration on a left side will be described and a configuration on a right side will be omitted.

First Embodiment

Figure 2:
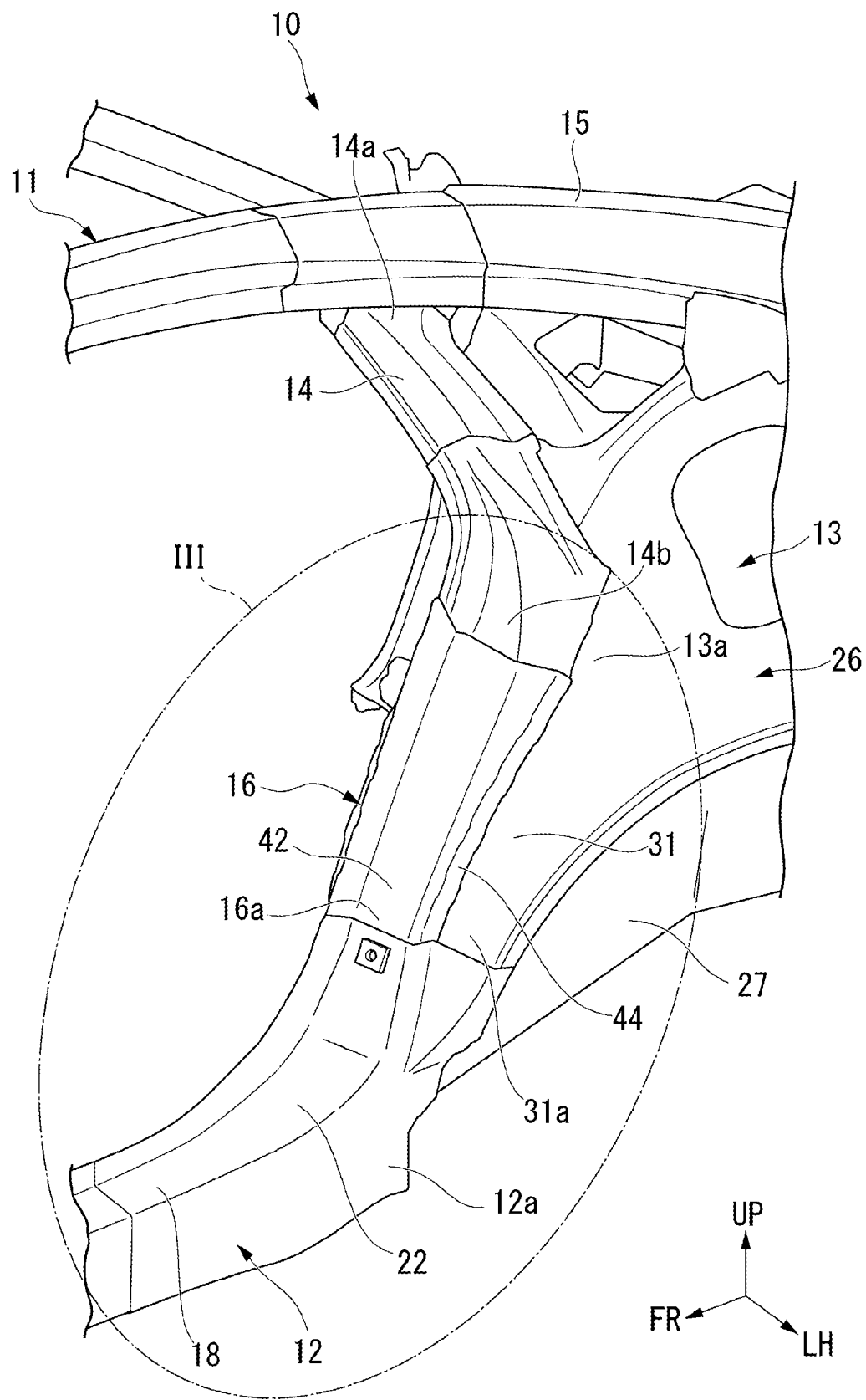
FIG. 2 is an enlarged perspective view of a portion II in FIG. 1.

As shown in FIG. 1 and FIG. 2, a vehicle body side structure 10 includes a side sill 12, a rear wheel house 13, a quarter pillar 14, a roof side rail 15, a wheel arch reinforcement member 16, a first bulkhead (a bulkhead) 50 (see FIG. 5) and a side panel outer member 17.

In addition, in the vehicle body side structure 10, a door opening section 18 is formed in a vehicle body side section 11. A corner section 22 of the door opening section 18 is formed in a V shape when seen in a side view by the side sill 12 and the rear wheel house 13 (specifically, an inner panel front section 31, which will be described below).

The side sill 12 and the rear wheel house 13 will be described below in detail.

The quarter pillar 14 extends from an upper section 13a of the rear wheel house 13 toward the roof side rail 15 to be inclined upward in front of a vehicle body. The roof side rail 15 is joined to an upper end portion 14a of the quarter pillar 14, and extends in the vehicle body forward/rearward direction.

The side panel outer member 17 is a panel that forms a design surface on an outward side in a vehicle width direction. The side panel outer member 17 has a side sill outer panel section 17a and a rear wheel outer section 17b.

The rear wheel house 13 is formed to cover a rear tire 24 from above. The rear wheel house 13 includes an inner panel 26 and a rear wheel house inner member 27 (see also FIG. 4). The inner panel 26 is formed to cover the rear tire 24 from above to the outside. The inner panel 26 has the inner panel front section 31 that forms a rearward inclination section of the door opening section 18. The inner panel front section 31 has a front end portion 31a that is joined to a rear end portion (an end portion) 12a of the side sill 12.

Figure 3:
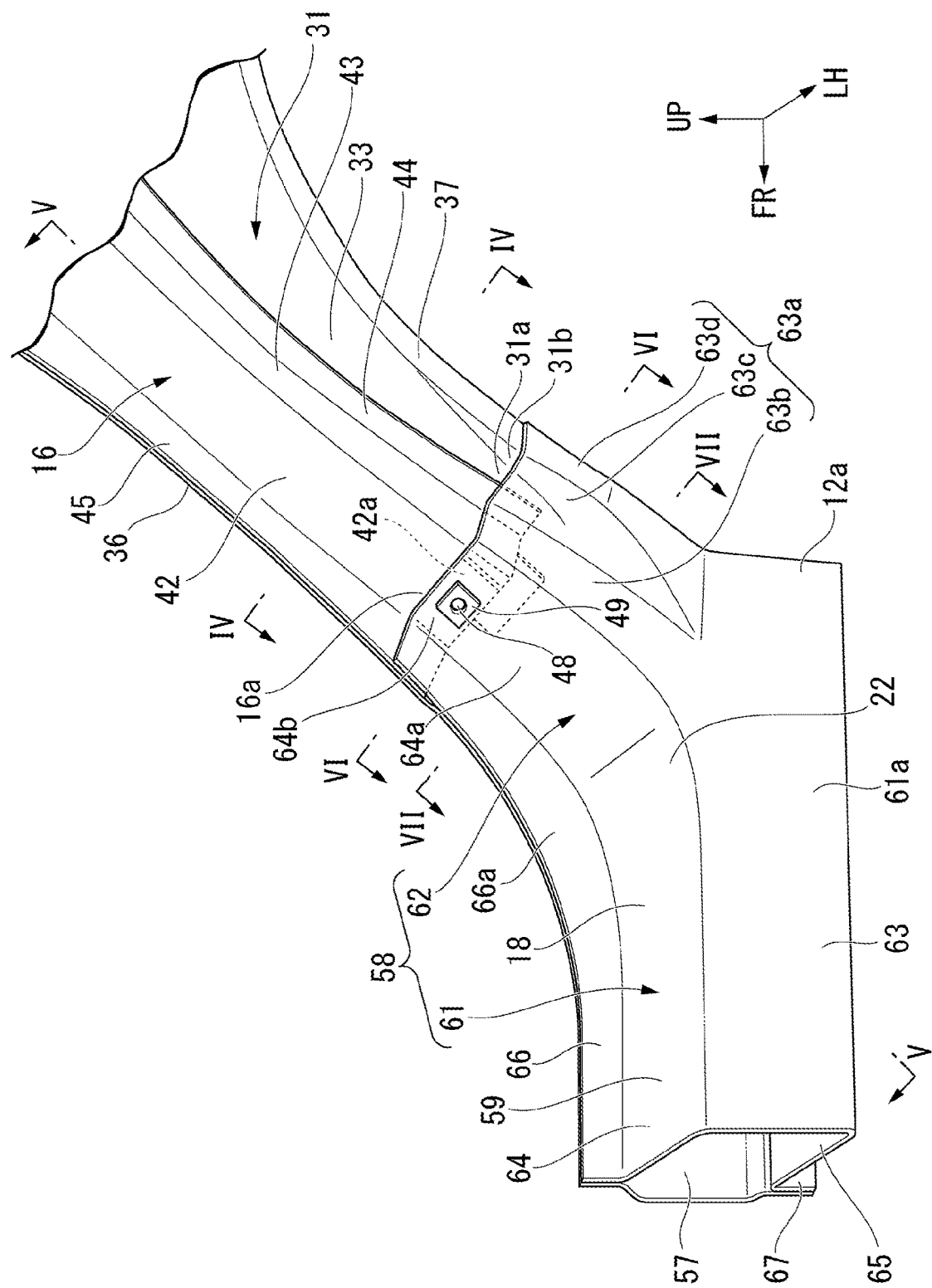
FIG. 3 is an enlarged perspective view of a portion III in FIG. 2.
Figure 4:
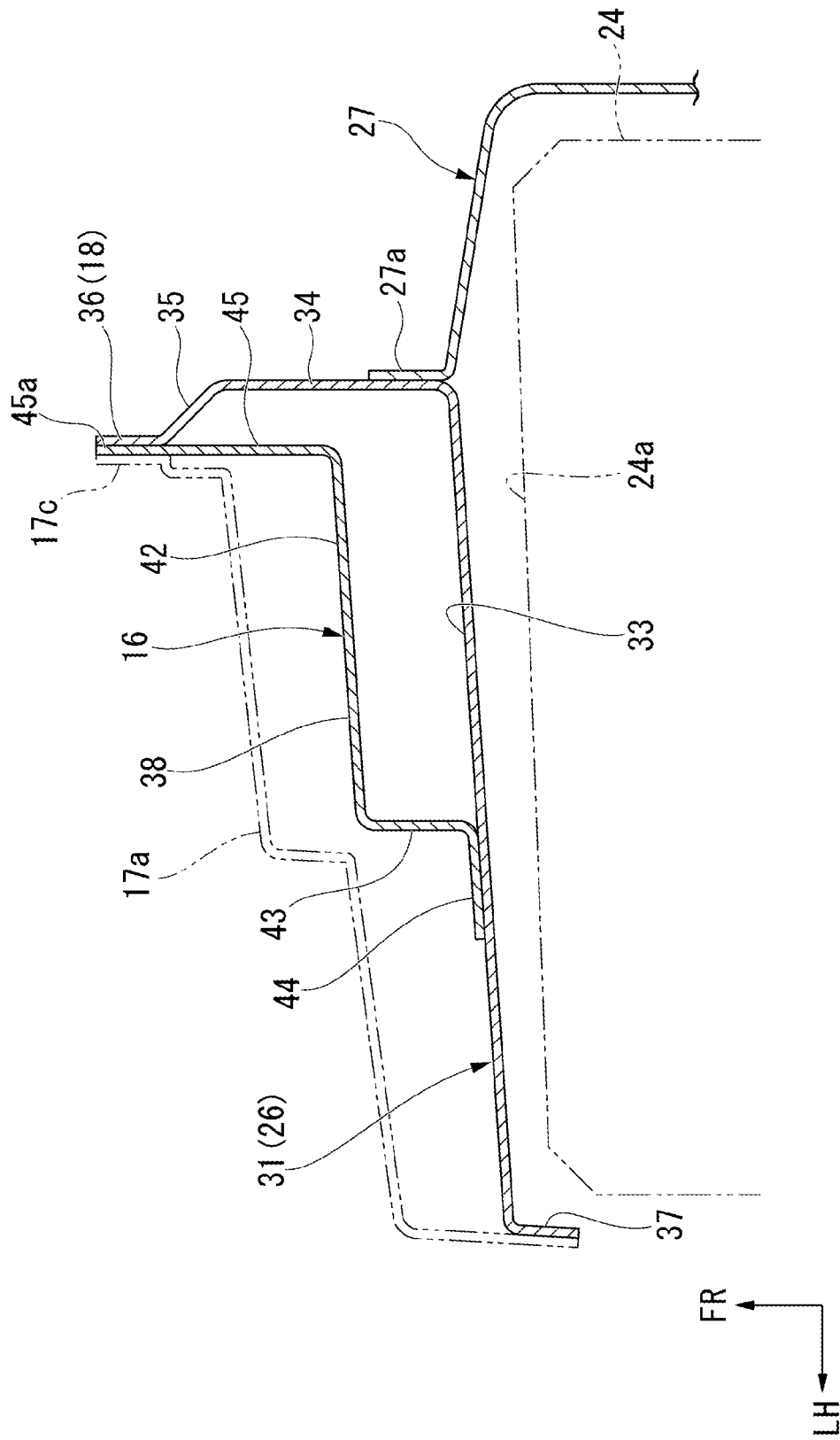
FIG. 4 is a cross-sectional view taken along line IV-IV in FIG. 3.

As shown in FIG. 3 and FIG. 4, the inner panel front section 31 has a panel front section 33, a panel-inside standing upper section 34, a panel-inside folded section 35, a panel-inside flange 36 and a panel-outside flange 37.

Figure 5:
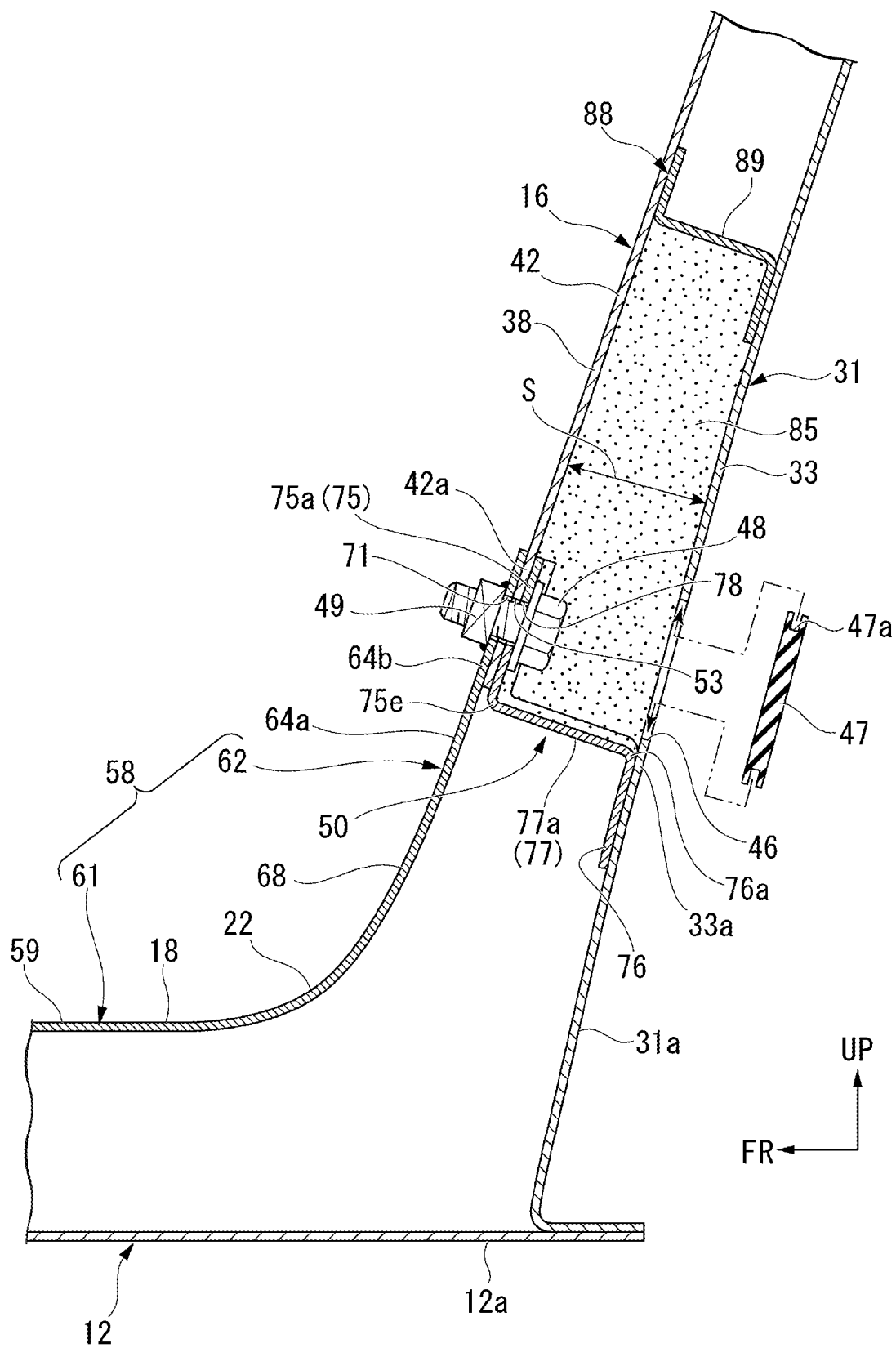
FIG. 5 is a cross-sectional view taken along line V-V in FIG. 3.

The panel front section 33 extends from the rear end portion 12a of the side sill 12 to a lower end portion 14b (see FIG. 2) of the quarter pillar 14 to be inclined toward a rear upper side of the vehicle body in a state disposed in the vehicle width direction. As shown in FIG. 5, the panel front section 33 has an insertion hole 46 and a hole closing member 47.

The insertion hole 46 opens in, for example, a circular shape at a position corresponding to a fastening bolt (a second fastening member) 48 and a fastening nut (a first fastening member) 49.

The insertion hole 46 is closed by the hole closing member 47. The hole closing member 47 is a grommet formed of, for example, a resin or rubber. The hole closing member 47 is formed in, for example, a disk shape, and a groove section 47a is formed in an outer circumference in an annular shape. Since the groove section 47a is fitted onto a circumferential edge of the insertion hole 46, the insertion hole 46 is closed by the hole closing member 47.

The insertion hole 46, the hole closing member 47, the fastening bolt 48 and the fastening nut 49 will be described below in detail.

Returning to FIG. 3 and FIG. 4, the panel-inside standing upper section 34 substantially vertically stands upward from an inner side of the panel front section 33. The panel-inside folded section 35 is folded and bent outward from an upper side of the panel-inside standing upper section 34 in the vehicle width direction. The panel-inside flange 36 overhangs upward from an outer side of the panel-inside folded section 35. The panel-inside flange 36 forms an edge portion of the door opening section 18. In addition, the panel-outside flange 37 overhangs downward from an outer side of the panel front section 33.

An inner flange 27a of the rear wheel house inner member 27 is joined to the panel-inside standing upper section 34 of the inner panel front section 31 from an inward side in the vehicle width direction. The rear wheel house inner member 27 is disposed inside the inner panel front section 31 (i.e., the inner panel 26 (see also FIG. 1)) in the vehicle width direction, and formed to cover the rear tire 24 (see FIG. 1) from above to an inward side.

In addition, the wheel arch reinforcement member 16 overlaps the inner panel front section 31 in front of the vehicle body from obliquely above. Accordingly, a first closed cross section 38 is constituted by the inner panel front section 31 and the wheel arch reinforcement member 16.

The wheel arch reinforcement member 16 has a front end portion 16a coupled to the rear end portion 12a of the side sill 12 (specifically, an upper end portion 64b of a side sill stiffener extension section 62, which will be described below), and extends to be inclined along the inner panel front section 31 toward a rear upper side of the vehicle body. The wheel arch reinforcement member 16 has a reinforcement arch top section 42, a reinforcement arch leg section 43, a reinforcement arch outer flange 44 and a reinforcement arch inner flange 45.

The reinforcement arch top section 42 extends to be inclined toward a rear upper side of the vehicle body from the front end portion 31a of the inner panel front section 31 to the lower end portion 14b (see FIG. 2) of the quarter pillar 14 along the panel front section 33. In this state, the reinforcement arch top section 42 is disposed on a front upper side of the vehicle body with respect to the panel front section 33 while having a gap therebetween (see also FIG. 5).

The reinforcement arch leg section 43 is formed integrally with an outer side of the reinforcement arch top section 42. Specifically, the reinforcement arch leg section 43 is folded and bent from an outer side of the reinforcement arch top section 42 toward the panel front section 33. The reinforcement arch outer flange 44 overhangs outward from a lower side of the reinforcement arch leg section 43 in the vehicle width direction along the panel front section 33. The reinforcement arch outer flange 44 is coupled to the panel front section 33.

The reinforcement arch inner flange 45 overhangs upward from an inner side of the reinforcement arch top section 42 along the panel-inside standing upper section 34. The reinforcement arch inner flange 45 has an upper side section 45a that is disposed at a position facing the panel-inside flange 36 of the inner panel front section 31, and the upper side section 45a is joined to the panel-inside flange 36 and an outer panel-inside flange 17c of the side sill outer panel section 17a. In other words, the reinforcement arch inner flange 45 is joined to the panel-inside flange 36 and the outer panel-inside flange 17c while the upper side section 45a is sandwiched therebetween.

In this way, the reinforcement arch outer flange 44 is joined to the panel front section 33. In addition, the upper side section 45a of the reinforcement arch inner flange 45 is joined to the panel-inside flange 36 from an outward side in the vehicle width direction. Accordingly, the first closed cross section 38 is constituted by the wheel arch reinforcement member 16 and the inner panel front section 31.

Figure 6:
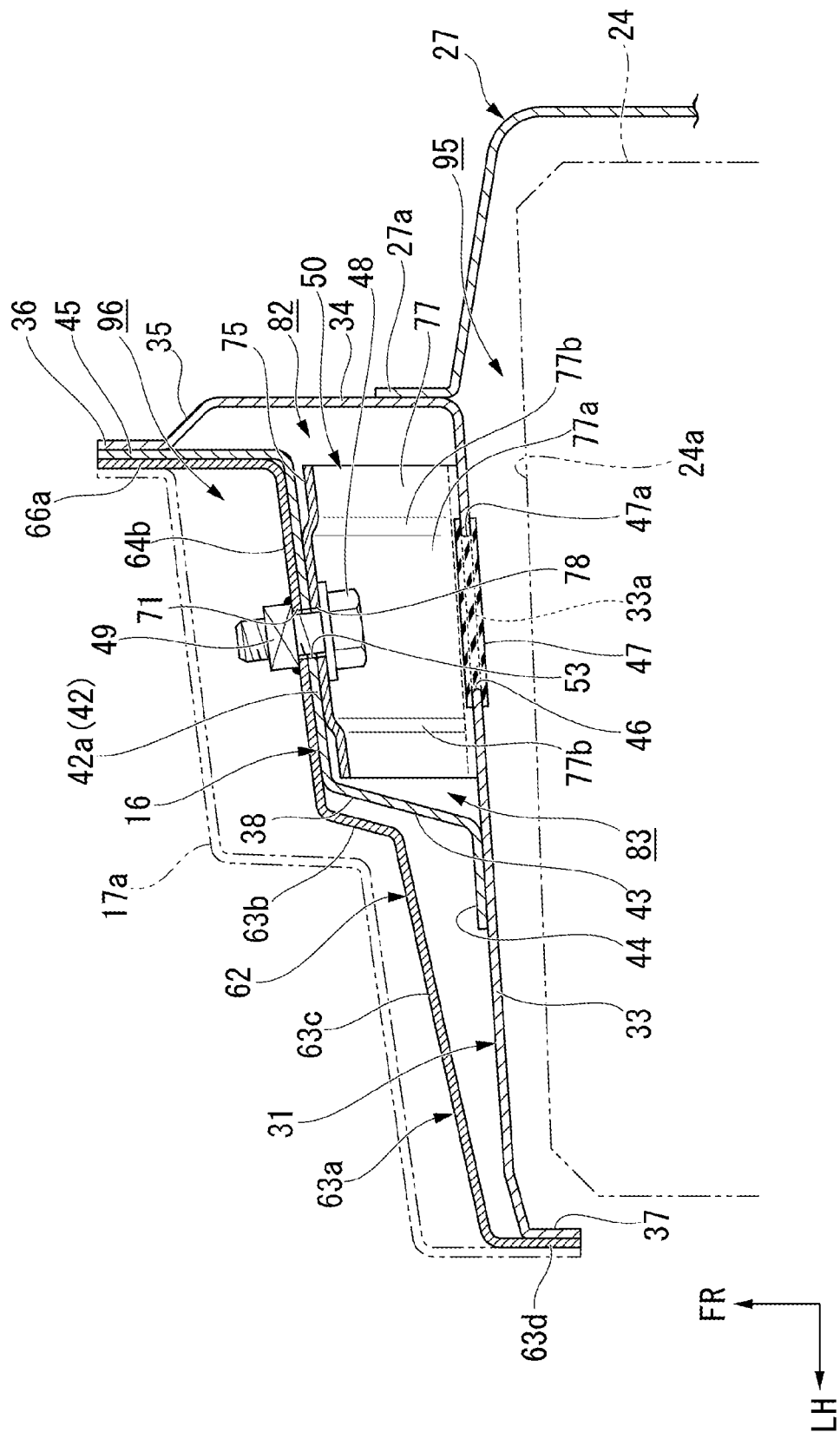
FIG. 6 is a cross-sectional view taken along line VI-VI in FIG. 3.

As shown in FIG. 5 and FIG. 6, the first bulkhead 50 is disposed inside of the first closed cross section 38. The first bulkhead 50 is interposed between a coupling arch portion 42a of the reinforcement arch top section 42 and a panel coupling portion 33a of the panel front section 33. The first bulkhead 50 will be described below in detail.

The coupling arch portion 42a is an area in a lower front end portion of the reinforcement arch top section 42 and has an attachment arch hole 53. The panel coupling portion 33a is an area in the panel front section 33 facing the coupling arch portion 42a and has the above-mentioned insertion hole 46. An attachment hole 78 of the first bulkhead 50 is disposed between the coupling arch portion 42a and the panel coupling portion 33a.

Figure 7:
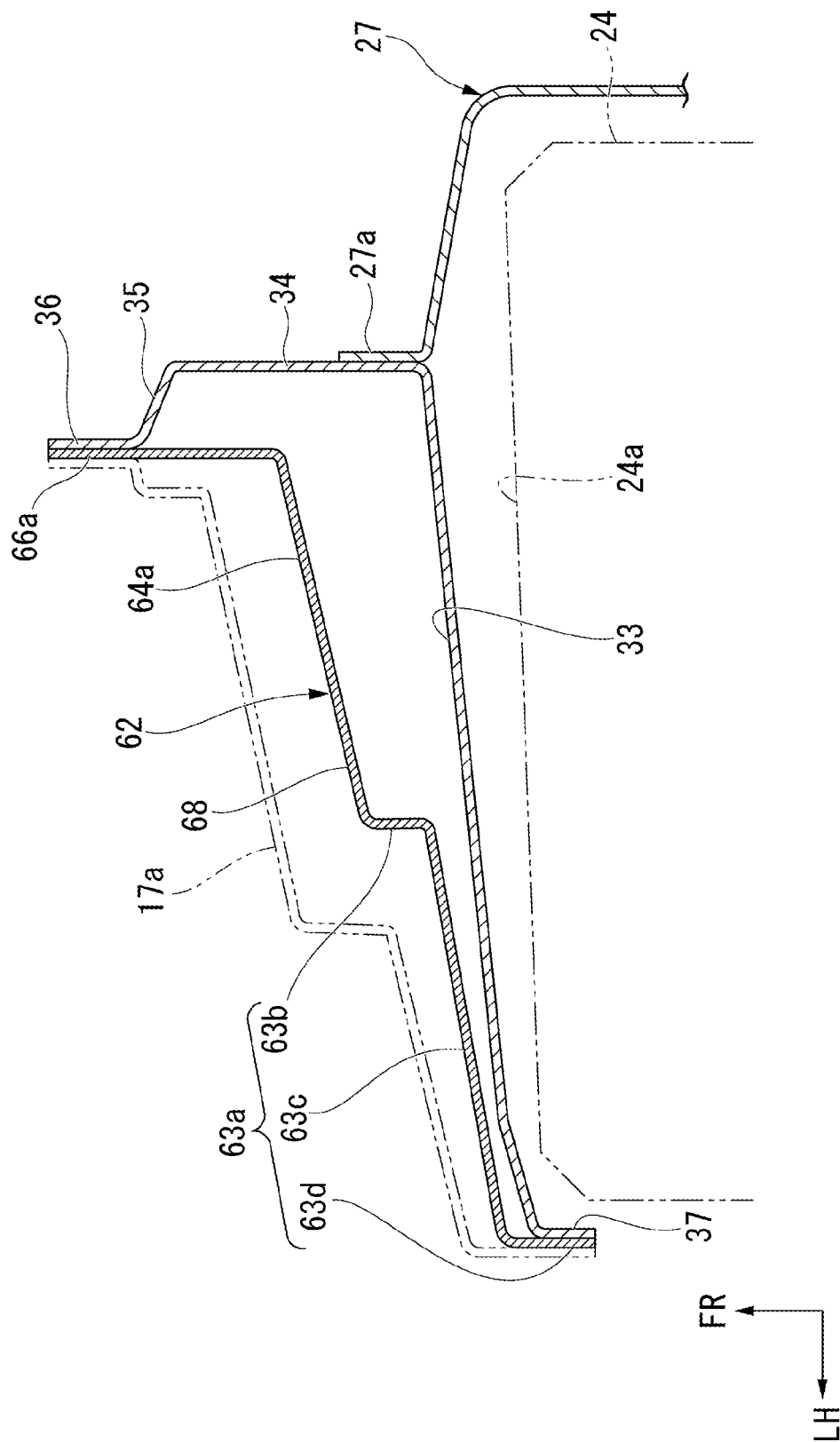
FIG. 7 is a cross-sectional view taken along line VII-VII in FIG. 3.

As shown in FIG. 3 and FIG. 7, the wheel arch reinforcement member 16 is joined along the inner panel front section 31. In this state, the rear end portion 12a of the side sill 12 is coupled to the front end portion 16a of the wheel arch reinforcement member 16.

The side sill 12 is disposed on, for example, a left outward side of the vehicle body in the vehicle width direction, and extends from the front end portion 16a of the wheel arch reinforcement member 16 in a forward direction of the vehicle body. The side sill 12 includes a side sill inner member 57, a side sill stiffener 58 and the side sill outer panel section 17a (see FIG. 1).

The side sill 12 has a closed cross section 59 formed in a rectangular hollow frame shape by the side sill inner member 57 and the side sill stiffener 58. Hereinafter, the closed cross section 59 of the side sill 12 is referred to as "a side sill closed cross section 59."

The side sill stiffener 58 has a side sill stiffener main body 61 and the side sill stiffener extension section 62. The side sill stiffener main body 61 has a stiffener main body outer wall 63, a stiffener main body upper wall 64, a stiffener main body lower wall 65, a stiffener main body upper flange 66 and a stiffener main body lower flange 67.

The stiffener main body upper wall 64 extends inward from an upper side of the stiffener main body outer wall 63 in the vehicle width direction (i.e., toward the side sill inner member 57). The stiffener main body lower wall 65 extends inward from a lower side of the stiffener main body outer wall 63 in the vehicle width direction (i.e., toward the side sill inner member 57). The stiffener main body upper flange 66 extends upward from an inner side of the stiffener main body upper wall 64. The stiffener main body lower flange 67 extends downward from an inner side of the stiffener main body lower wall 65.

The side sill stiffener main body 61 is formed in a cross-sectional hat shape by the stiffener main body outer wall 63, the stiffener main body upper wall 64, the stiffener main body lower wall 65, the stiffener main body upper flange 66, and the stiffener main body lower flange 67. The stiffener main body upper flange 66 and the stiffener main body lower flange 67 are joined to the side sill inner member 57 in a state in which the stiffener main body upper flange 66 and the stiffener main body lower flange 67 overlap the side sill inner member 57 from an outward side in the vehicle width direction. Accordingly, the side sill closed cross section 59 of the side sill 12 is formed in a rectangular frame shape by the side sill stiffener 58 and the side sill inner member 57.

The side sill stiffener extension section 62 is provided integrally with a rear end portion 61*a* of the side sill stiffener main body 61. The side sill stiffener extension section 62 extends from the rear end portion 61*a* of the side sill stiffener main body 61 to the front end portion 16*a* of the wheel arch reinforcement member 16 toward behind and above in the vehicle body. The side sill stiffener extension section 62 forms the corner section 22 of the door opening section 18 in a V shape together with the rear end portion 61*a* of the side sill stiffener main body 61.

The side sill stiffener extension section 62 is an area that forms a part of the rear end portion 12*a* of the side sill 12. The side sill stiffener extension section 62 is formed to roughly follow the front end portion 16*a* of the wheel arch reinforcement member 16 and an portion 31*b* which is an outside portion of the front end portion 31*a* of the inner panel front section 31 in the vehicle width direction. Accordingly, the side sill stiffener extension section 62 extending to the front end portion 16*a* of the wheel arch reinforcement member 16 is disposed to overlap the front end portion 16*a* and the portion 31*b* of the inner panel front section 31 outside in the vehicle width direction from a side outward from the vehicle body (from above).

Specifically, the side sill stiffener extension section 62 has a stiffener extension upper wall 64*a*, a stiffener extension upper flange 66*a* and a stiffener extension outer wall 63*a*.

The stiffener extension upper wall 64*a* extends flatly (partially, to be curved) from the rear end portion of the stiffener main body upper wall 64 to the coupling arch portion 42*a* of the reinforcement arch top section 42 toward behind and above in the vehicle body.

As shown in FIG. 5 and FIG. 6, the stiffener extension upper wall 64*a* has a stiffener attachment hole 71 formed at a center of the upper end part 64*b* in the vehicle width direction. Hereinafter, the upper end part 64*b* of the stiffener extension upper wall 64*a* is referred to as "a stiffener coupling portion 64*b*."

The fastening nut 49 is fixed to the stiffener coupling portion 64*b* through welding at a position corresponding to the stiffener attachment hole 71 which is on a surface at a side facing the side sill outer panel section 17*a* (see also FIG. 1).

Returning to FIG. 3 and FIG. 7, the stiffener extension upper flange 66*a* extends from the rear end portion of the stiffener main body upper flange 66 to the front end portion of the reinforcement arch inner flange 45 toward behind and above in the vehicle body.

The stiffener extension upper flange 66*a* has an upper end portion coupled to the front end portion of the reinforcement arch inner flange 45 and the panel-inside flange 36 from an outward side in the vehicle width direction (see also FIG. 6), and an area close to the upper end portion is coupled to the panel-inside flange 36 from an outward side in the vehicle width direction.

The stiffener extension outer wall 63*a* has a first extension outer wall 63*b*, a second extension outer wall 63*c* and a third extension outer wall 63*d*.

The first extension outer wall 63*b* is folded and bent from the outer side of the stiffener extension upper wall 64*a* toward behind the vehicle body. The second extension outer wall 63*c* is folded and bent outward from the rear side of the first extension outer wall 63*b* in the vehicle width direction. The third extension outer wall 63*d* is folded and bent from the outer side of the second extension outer wall 63*c* toward behind the vehicle body.

The stiffener extension outer wall 63*a* extends from the rear end portion of the stiffener main body outer wall 63 toward behind and above in the vehicle body. The rear end portion of the stiffener extension outer wall 63*a* is disposed to cover the front end portion of the reinforcement arch leg section 43, the front end portion of the reinforcement arch outer flange 44, the front end portion of the panel front section 33, and the front end portion of the panel-outside flange 37 from a side outward from the vehicle body.

The rear end portion of the third extension outer wall 63*d* is coupled to the front end portion of the panel-outside flange 37 from an outward side in the vehicle width direction. In this state, a second closed cross section 68 is constituted by the panel front section 33 and the side sill stiffener extension section 62.

As shown in FIG. 5, the second closed cross section 68 is smoothly (fluently) coupled (connected) to the side sill closed cross section 59 and the first closed cross section 38 such that the lower end portion is in communication with the side sill closed cross section 59 and the upper end portion is in communication with the first closed cross section 38.

That is, a continuous closed cross section is constituted by the first closed cross section 38, the second closed cross section 68 and the side sill closed cross section 59. That is, a cross-sectional shape of a high strength and high rigidity side sill frame (the side sill closed cross section 59 and the second closed cross section 68) provided so as to endure a lateral collision load and a cross-sectional shape of the first closed cross section 38 are formed to be continuous. Accordingly, rigidity and strength of the first closed cross section 38, the second closed cross section 68 and the side sill closed cross section 59 are secured. Accordingly, rigidity (bending in the vehicle body forward/rearward direction or rigidity with respect to twist) of the first closed cross section 38 can be increased.

As shown in FIG. 5 and FIG. 6, the first bulkhead 50 is interposed between the reinforcement arch top section 42 of the wheel arch reinforcement member 16 and the panel front section 33 of the inner panel front section 31.

The first bulkhead 50 is disposed in the first closed cross section 38. Specifically, the first bulkhead 50 is disposed on a boundary between the first closed cross section 38 and the second closed cross section 68. The first bulkhead 50 is coupled to the stiffener coupling portion 64*b* of the side sill stiffener extension section 62 and the coupling arch portion 42*a* of the reinforcement arch top section 42 by the fastening bolt 48 and the fastening nut 49 in a state being disposed inside of the first closed cross section 38.

That is, the area (the stiffener coupling portion 64*b* and the coupling arch portion 42*a*) in which the side sill stiffener extension section 62 and the wheel arch reinforcement member 16 are coupled can be disposed behind and above in the vehicle body with respect to the corner section 22. Accordingly, the area in which the side sill stiffener extension section 62 and the wheel arch reinforcement member 16 are coupled can be disposed at a place having a bending stress relatively lower than that of the corner section 22, for example, when a load is input to the vehicle body due to a lateral collision.

In addition, the first bulkhead 50 is coupled to the panel coupling portion 33a of the panel front section 33. Accordingly, a shape of the first closed cross section 38 with respect to the stress (in particular, bending stress) generated due to a lateral collision can be secured, and deformation (collapse, folding) of the wheel arch reinforcement member 16 or the like can be minimized.

Here, in a state in which the first bulkhead 50 is coupled to the panel coupling portion 33a of the panel front section 33, the first closed cross section 38 is partitioned by the first bulkhead 50 while being in communication with a part thereof from the second closed cross section 68. Specifically, the first closed cross section 38 and the second closed cross section 68 are partitioned by the first bulkhead 50 in a state in which first and second cavities 82 and 83 on both sides of the first bulkhead 50 are in communication with each other.

Figure 8:
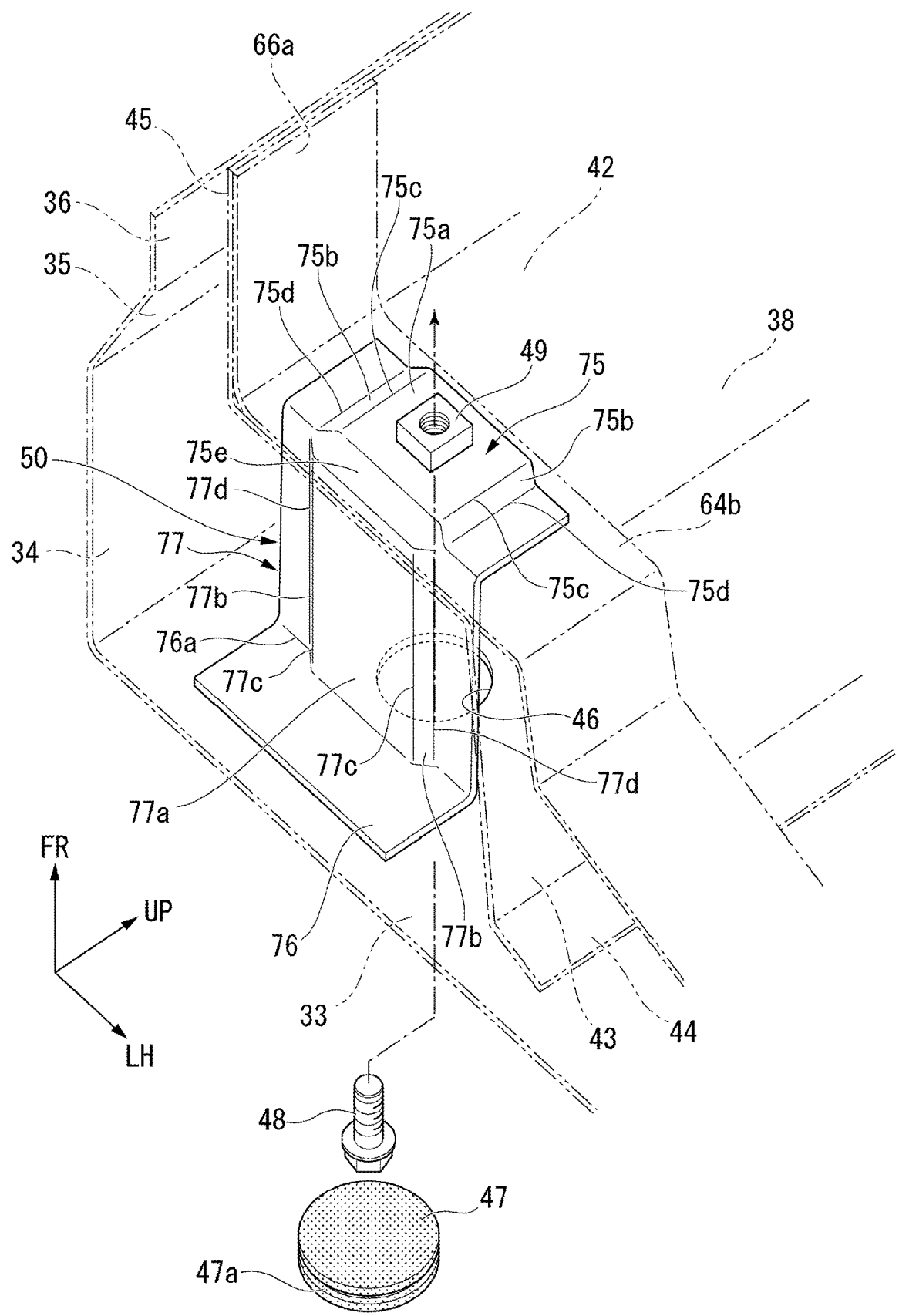
FIG. 8 is a perspective view showing a first bulkhead of the first embodiment.

As shown in FIG. 5 and FIG. 8, the first bulkhead 50 has a first connecting section 75, a second connecting section 76 and a wall section 77. The first connecting section 75 is disposed along the coupling arch portion 42a of the reinforcement arch top section 42 in a shape inclined in the upward/downward direction. The first connecting section 75 is formed in, for example, a rectangular shape when seen in a plan view, and has a connecting central section 75a, the attachment hole 78 and a pair of connecting beads 75b.

The connecting central section 75a is disposed at a center of the first connecting section 75 in the vehicle width direction, and extends toward the front of the vehicle body in a rectangular shape. The attachment hole 78 is formed to pass through the connecting central section 75a.

The connecting beads 75b are formed on both sides of the connecting central section 75a in the vehicle width direction, and have a first connecting ridge section 75c and a second connecting ridge section 75d that extend in the upward/downward direction.

The second connecting section 76 is disposed along the panel coupling portion 33a of the panel front section 33 in a shape inclined in the upward/downward direction. The second connecting section 76 is formed in, for example, a rectangular shape when seen in a plan view, and coupled to the panel coupling portion 33a through spot welding or the like. The first connecting section 75 and the second connecting section 76 are connected by the wall section 77.

The wall section 77 is disposed in a shape inclined forward and rearward from the vehicle body when a front side is connected to a lower side 75e of the first connecting section 75 and a rear side is connected to an upper side 76a of the second connecting section 76. The wall section 77 is formed in, for example, a rectangular shape when seen in a plan view, and has a wall central section 77a and a pair of wall beads (beads) 77b.

The wall central section 77a is continuous with the connecting central section 75a and formed at a center in the vehicle width direction, and extends downward in a rectangular shape. The wall beads 77b are formed on both sides of the wall central section 77a in the vehicle width direction, and have first wall ridge sections 77c and second wall ridge sections 77d, which extend in the vehicle body forward/rearward direction. The first wall ridge section 77c and the second wall ridge section 77d extend toward the first connecting section 75 and the second connecting section 76 in the vehicle body forward/rearward direction.

The first connecting section 75, the second connecting section 76 and the wall section 77 are integrally formed of, for example, a plate member. The lower side 75e of the first connecting section 75 is folded and bent upward from the front side of the wall section 77. The upper side 76a of the second connecting section 76 is folded and bent downward from the rear side of the wall section 77. Accordingly, the first bulkhead 50 is formed of a sheet of plate member in a crank shape.

Accordingly, since the first bulkhead 50 can be simply formed through folding and bending, productivity of the first bulkhead 50 can be improved.

In a state in which the first bulkhead 50 is disposed inside of the first closed cross section 38, the second connecting section 76 is coupled to, for example, the panel coupling portion 33a through spot welding or the like. In this state, the connecting central section 75a of the first connecting section 75 abuts the coupling arch portion 42a of the reinforcement arch top section 42. In addition, the attachment hole 78 of the connecting central section 75a is disposed at a position corresponding to the attachment arch hole 53 of the coupling arch portion 42a, the stiffener attachment hole 71 of the stiffener coupling portion 64b, and the fastening nut 49. Further, the insertion hole 46 is disposed at a position corresponding to the attachment hole 78 (i.e., the fastening nut 49) of the connecting central section 75a. The insertion hole 46 is formed in the panel coupling portion 33a of the panel front section 33.

The fastening bolt 48 is disposed in the first closed cross section 38 through the insertion hole 46. The fastening bolt 48 disposed inside of the first closed cross section 38 is fastened to the fastening nut 49 through the attachment hole 78, the attachment arch hole 53 and the stiffener attachment hole 71. Accordingly, the first connecting section 75 is fastened to the coupling arch portion 42a and the stiffener coupling portion 64b by the fastening bolt 48 and the fastening nut 49.

In this way, the second connecting section 76 is coupled to the panel coupling portion 33a, the first connecting section 75 is coupled to the coupling arch portion 42a and the stiffener coupling portion 64b, and thus, the wall section 77 of the first bulkhead 50 is disposed on a boundary between the first closed cross section 38 and the second closed cross section 68.

In this way, since the fastening bolt 48 is fastened to the fastening nut 49 through the insertion hole 46 of the panel front section 33, the first connecting section 75 can be coupled to the coupling arch portion 42a and the stiffener coupling portion 64b by the fastening bolt 48 and the fastening nut 49. Accordingly, for example, in an attachment process of a sub-frame or a suspension that is a post-process of covering the side sill stiffener 58 with the side sill outer panel section 17a from a side outward from the vehicle, the coupling arch portion 42a, the stiffener coupling portion 64b and the first connecting section 75 can be coupled to each other.

Meanwhile, when the coupling arch portion 42a, the stiffener coupling portion 64b and the first connecting section 75 are coupled through, for example, welding or adhesion, the side sill stiffener 58 is coupled thereto by a welding machine or an adhesive agent coating machine from a side outward from the vehicle. For this reason, in a process before covering the side sill stiffener 58 with the side sill outer panel section 17a from a side outward from the vehicle, coupling by the welding machine or the adhesive agent coating machine is needed.

Here, the first connecting section 75 is coupled to the coupling arch portion 42a and the stiffener coupling portion 64b by the fastening bolt 48 and the fastening nut 49.

Accordingly, the process of coupling the first connecting section 75 to the coupling arch portion 42*a* and the stiffener coupling portion 64*b* using the welding machine or the adhesive agent coating machine can be omitted, and productivity can be improved.

As shown in FIG. 5 and FIG. 6, in a state in which the first bulkhead 50 is disposed on a boundary between the first closed cross section 38 and the second closed cross section 68, the wall section 77 is provided below the insertion hole 46.

In addition, a first cavity (cavity) 82 and a second cavity (cavity) 83 are formed between the first closed cross section 38 and the wall section 77. The first cavity 82 and the second cavity 83 are set to be smaller than the fastening bolt 48. Accordingly, when the fastening bolt 48 is dropped at inside of the first closed cross section 38, the wall section 77 becomes a receiver, and productivity can be improved by preventing dropping of the fastening bolt 48.

On the other hand, in the case in which the wall section 77 is disposed above the insertion hole 46, when the fastening bolt 48 is dropped at inside of the first closed cross section 38, the fastening bolt 48 drops to below the second closed cross section 68. For this reason, it is difficult to pick up the fastening bolt 48 from below the second closed cross section 68.

Here, the first closed cross section 38 has a front wall constituted by the reinforcement arch top section 42 and a rear wall constituted by the panel front section 33. A gap S between the reinforcement arch top section 42 and the panel front section 33 is increased toward the second closed cross section 68. That is, the first closed cross section 38 is increased toward the second closed cross section 68. In other words, the first closed cross section 38 is formed to have a substantially rectangular cross section that thins as it goes upward.

Here, the wall section 77 is provided on the lower side 75*e* on the side of a region in the first connecting section 75 in which the first closed cross section 38 is large. In this state, the first closed cross section 38 is filled with a foaming agent 85 from the insertion hole 46. As the foaming agent 85, for example, urethane, spray foam, or the like, is exemplified.

When the first closed cross section 38 is filled with the foaming agent 85 from the insertion hole 46, the wall section 77 can function as a partition plate. Accordingly, for example, since the first closed cross section 38 having a smaller cross-sectional area than that of the second closed cross section 68 is filled with the foaming agent 85 in a filling direction of the foaming agent 85, the first closed cross section 38 having a small cross-sectional area can be reinforced by the foaming agent 85. Accordingly, since the foaming agent 85 can be filled only in the first closed cross section having a small cross-sectional area, there is no need to fill the second closed cross section 68 having a large cross-sectional area with the foaming agent 85, which can reduce vehicle body vibrations and improve productivity.

Further, for example, a second bulkhead 88 is provided inside of the first closed cross section 38 at a position spaced by a fixed distance from the insertion hole 46 to a side opposite to the second closed cross section 68. Accordingly, a region to be reinforced with the foaming agent 85 can be restricted by a wall section 89 of the second bulkhead 88.

In a state in which the first closed cross section 38 is filled with the foaming agent 85 from the insertion hole 46, the groove section 47*a* of the hole closing member 47 is fitted onto the circumferential edge of the insertion hole 46. Accordingly, the insertion hole 46 is closed by the hole closing member 47. Accordingly, entering of foreign substances such as water, gravel, or the like into the first closed cross section 38 from the insertion hole 46 can be minimized. Further, for example, entering of sound or the like into the first closed cross section 38 from the insertion hole 46 can be minimized.

As shown in FIG. 5 and FIG. 8, in a state in which the first bulkhead 50 is provided inside of the first closed cross section 38, the wall beads 77*b* (including the first wall ridge section 77*c* and the second wall ridge section 77*d*) extend toward the first connecting section 75 and the second connecting section 76 in the vehicle body forward/rearward direction. Accordingly, rigidity of the wall section 77 against a compression direction can be increased by the wall beads 77*b*. Accordingly, when bending stress (bending in the vehicle body forward/rearward direction) is applied to the first closed cross section 38, a load in the compression direction input to the wall section 77 can be supported (i.e., through stiffness) by the wall section 77, and deformation (collapse, folding) of the first closed cross section 38 can be minimized.

As described above, the side sill stiffener extension section 62 of the side sill stiffener 58 extends from the rear end portion 12*a* of the side sill 12 toward behind and above in the vehicle body. That is, the side sill stiffener extension section 62 integrated with the side sill stiffener 58 can stand up from the rear end portion 12*a* of the side sill 12 toward behind and above in the vehicle body. The coupling arch portion 42*a* of the wheel arch reinforcement member 16 is coupled to the stiffener coupling portion 64*b* of the side sill stiffener extension section 62.

Accordingly, the side sill stiffener extension section 62 and the wheel arch reinforcement member 16 can be coupled to the corner section 22 of the door opening section 18 behind and above in the vehicle body. In addition, the first bulkhead 50 is coupled to the side sill stiffener extension section 62 and the wheel arch reinforcement member 16.

Accordingly, the area in which the side sill stiffener extension section 62, the wheel arch reinforcement member 16 and the first bulkhead 50 are coupled (the first connecting section 75 is coupled to the coupling arch portion 42*a* and the stiffener coupling portion 64*b*) can be disposed behind and above in the vehicle body with respect to the corner section 22. That is, the area in which the side sill stiffener extension section 62, the wheel arch reinforcement member 16 and the first bulkhead 50 are coupled can be disposed at a place having a relatively smaller bending stress than that of the corner section, for example, when a load is input to vehicle body due to a lateral collision. In addition, the first closed cross section 38 of the wheel arch reinforcement member 16 is partitioned by the first bulkhead 50. Accordingly, the cross-sectional shape can be held by the first bulkhead 50 that partitions the first closed cross section 38 with respect to the stress (in particular, bending stress) generated due to the lateral collision. Accordingly, deformation (collapse, folding) of the wheel arch reinforcement member 16 or the like that constitutes the first closed cross section 38 can be minimized.

In this way, the side sill stiffener extension section 62 of the side sill stiffener 58 is extended. Accordingly, peeling off (breaking) of the coupling sections can be maintained by the first bulkhead 50 using a simple configuration in which the side sill stiffener extension section 62, the wheel arch reinforcement member 16 and the first bulkhead 50 are coupled. Accordingly, since the side sill stiffener 58 and the wheel arch reinforcement member 16 can be strongly coupled using the simple configuration and there is no need to provide excessively strong coupling, the side sill stiffener 58 and the wheel arch reinforcement member 16 can be coupled cheaply with little weight.

Next, a second embodiment to a fifth embodiment will be described with reference to FIG. 9 to FIG. 12. Further, in the second embodiment to the fifth embodiment, the same components as or similar components to the vehicle body side structure 10 of the first embodiment are designated by the same reference numerals and detailed description thereof will be omitted.

Second Embodiment

Figure 9:
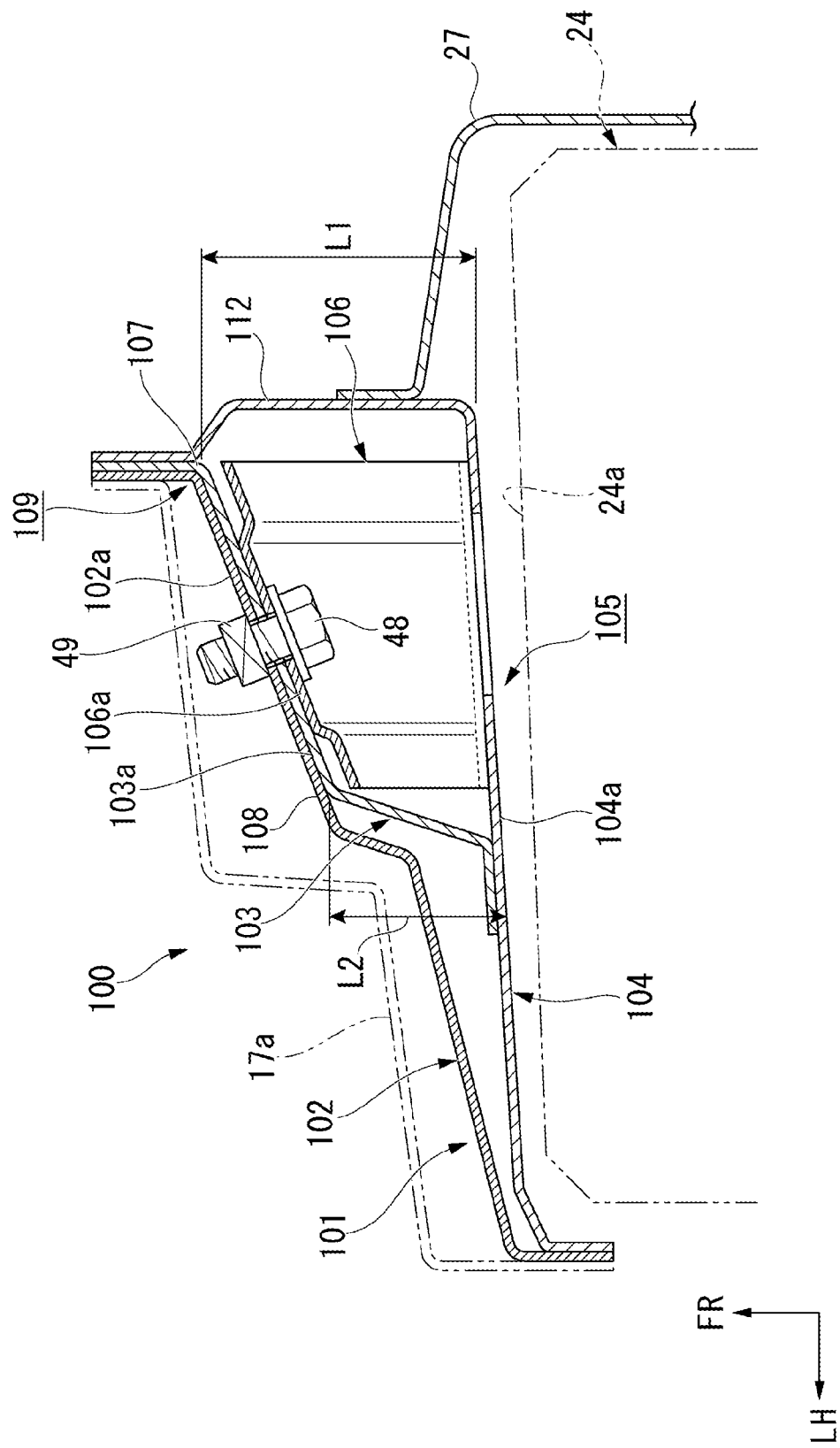
FIG. 9 is a cross-sectional view showing a vehicle body side structure of a second embodiment according to the present invention.

As shown in FIG. 9, a vehicle body side structure 100 is configured such that an area in which a side sill stiffener extension section 102 and a wheel arch reinforcement member 103 are coupled is inclined in the vehicle width direction. Specifically, the area in which the side sill stiffener extension section 102 and the wheel arch reinforcement member 103 are coupled is inclined such that a first distance L1 with respect to an inner panel 104 at an inner side in the vehicle width direction is increased greater than a second distance L2 with respect to an inner panel 104 at the outer side in the vehicle width direction. In addition, the side sill stiffener extension section 102 is formed integrally with a side sill stiffener 101.

The inner panel 104 has a panel front section 104a that is substantially horizontally disposed along an outer circumferential surface 24a of the rear tire 24 in the vehicle width direction in comparison with the panel front section 33 of the inner panel 26 of the first embodiment. Accordingly, a third cavity 105 between the panel front section 104a and the outer circumferential surface 24a of the rear tire 24 can be minimized in size than a cavity 95 (see FIG. 6) of the first embodiment.

The side sill stiffener extension section 102 is formed such that an inclination of a stiffener coupling portion 102a is set to be greater than that of the stiffener coupling portion 64b of the side sill stiffener extension section 62 of the first embodiment. In addition, the wheel arch reinforcement member 103 is formed such that an inclination of a coupling arch portion 103a is set to be greater than that of the coupling arch portion 42a of the wheel arch reinforcement member 16 of the first embodiment. Further, a first bulkhead (a bulkhead) 106 is formed such that an inclination of a first connecting section 106a is set to be greater than that of the first connecting section 75 of the first bulkhead 50 of the first embodiment.

That is, the inclinations of the stiffener coupling portion 102a and the coupling arch portion 103a are disposed at a relatively large downward gradient with respect to the panel front section 104a from an inner end portion 107 on an inward side in the vehicle width direction to an outer end portion 108 on an inward side in the vehicle width direction. Accordingly, a fourth cavity (a dead space) 109 between the stiffener coupling portion 102a and the side sill outer panel section 17a can be minimized in size than a cavity 96 (see FIG. 6) of the first embodiment.

In this way, since the third cavity 105 and the fourth cavity 109 are minimized to be smaller, for example, a cross-sectional area (a region) of a first closed cross section 112 can be more greatly secured than that of the first closed cross section 38 (see FIG. 6) of the first embodiment. Accordingly, a shape of the first closed cross section 112 can be more appropriately secured, and deformation (collapse, folding) of the wheel arch reinforcement member 103 or the like can be more appropriately minimized.

In addition, according to the vehicle body side structure 100, like the first embodiment, the side sill stiffener extension section 102 of the side sill stiffener 101 is extended, and the side sill stiffener extension section 102, the wheel arch reinforcement member 103 and the first bulkhead 106 are coupled to each other. Accordingly, the side sill stiffener 101 and the wheel arch reinforcement member 103 can be strongly coupled to each other using a simple configuration.

Third Embodiment

Figure 10:
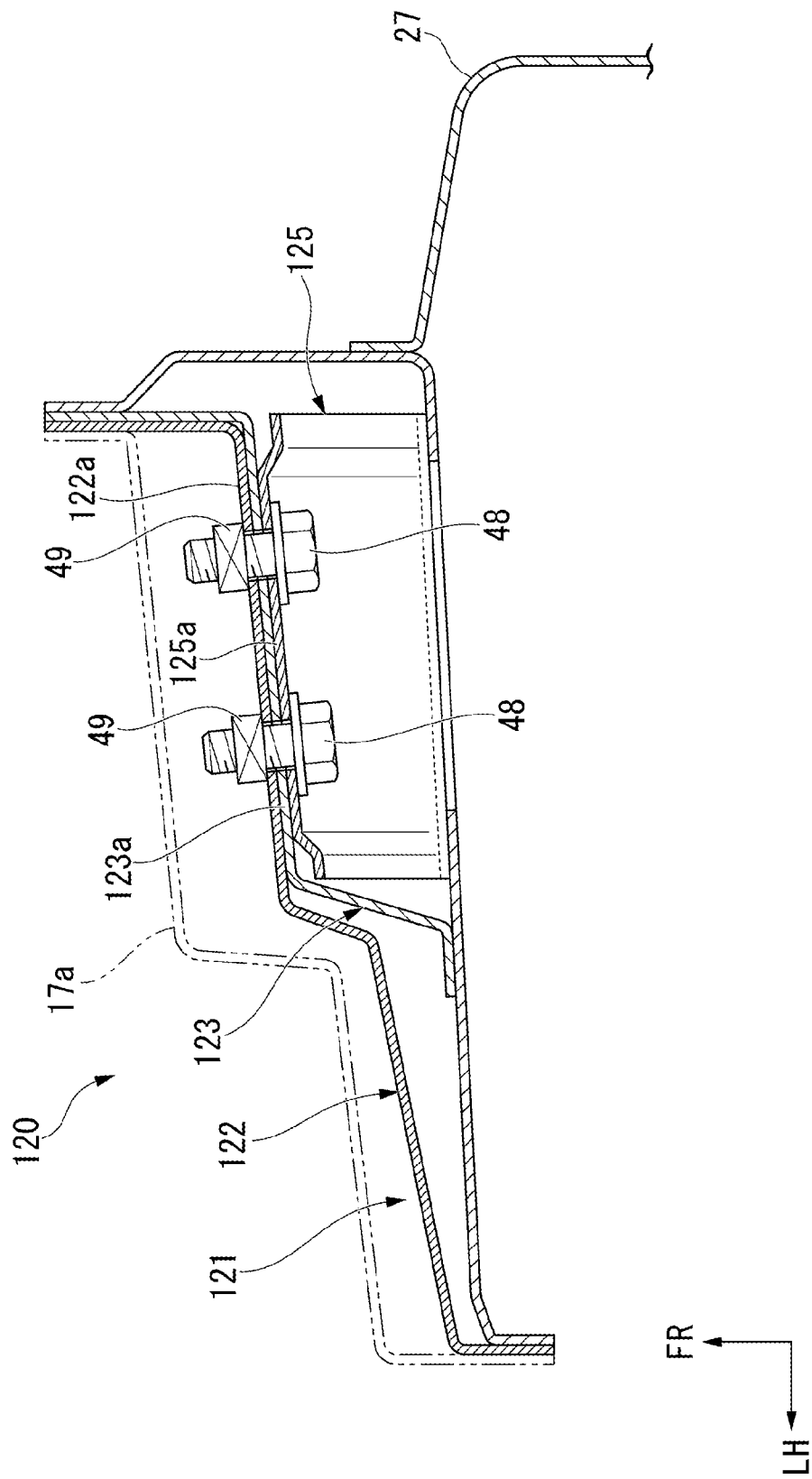
FIG. 10 is a cross-sectional view showing a vehicle body side structure of a third embodiment according to the present invention.

As shown in FIG. 10, for example, a vehicle body side structure 120 is coupled by the fastening bolt 48 and the fastening nut 49 in at least two places in an area in which a side sill stiffener extension section 122 and a wheel arch reinforcement member 123 are coupled. The side sill stiffener extension section 122 is formed integrally with a side sill stiffener 121.

That is, a first connecting section 125a of a first bulkhead (a bulkhead) 125, a coupling arch portion 123a of the wheel arch reinforcement member 123, and a stiffener coupling portion 122a of the side sill stiffener extension section 122 are coupled by the fastening bolt 48 and the fastening nut 49. Specifically, the first connecting section 125a, the coupling arch portion 123a and the stiffener coupling portion 122a are coupled by the fastening bolt 48 and the fastening nut 49 in at least two places in the vehicle width direction.

Accordingly, in the coupling arch portion 123a and the stiffener coupling portion 122a, the first connecting section 125a, the coupling arch portion 123a and the stiffener coupling portion 122a can be more strongly coupled with no increase in overlapping of the coupled areas in the upward/downward direction.

Further, in the coupling arch portion 123a and the stiffener coupling portion 122a, since there is no need to increase the overlapping in the upward/downward direction, reduction in weight of the vehicle body can be achieved.

In addition, according to the vehicle body side structure 120, like the first embodiment, the side sill stiffener extension section 122 of the side sill stiffener 121 extends, and the side sill stiffener extension section 122, the wheel arch reinforcement member 123 and the first bulkhead 125 are coupled to each other. Accordingly, the side sill stiffener 121 and the wheel arch reinforcement member 123 can be strongly coupled using a simple configuration.

Fourth Embodiment

Figure 11:
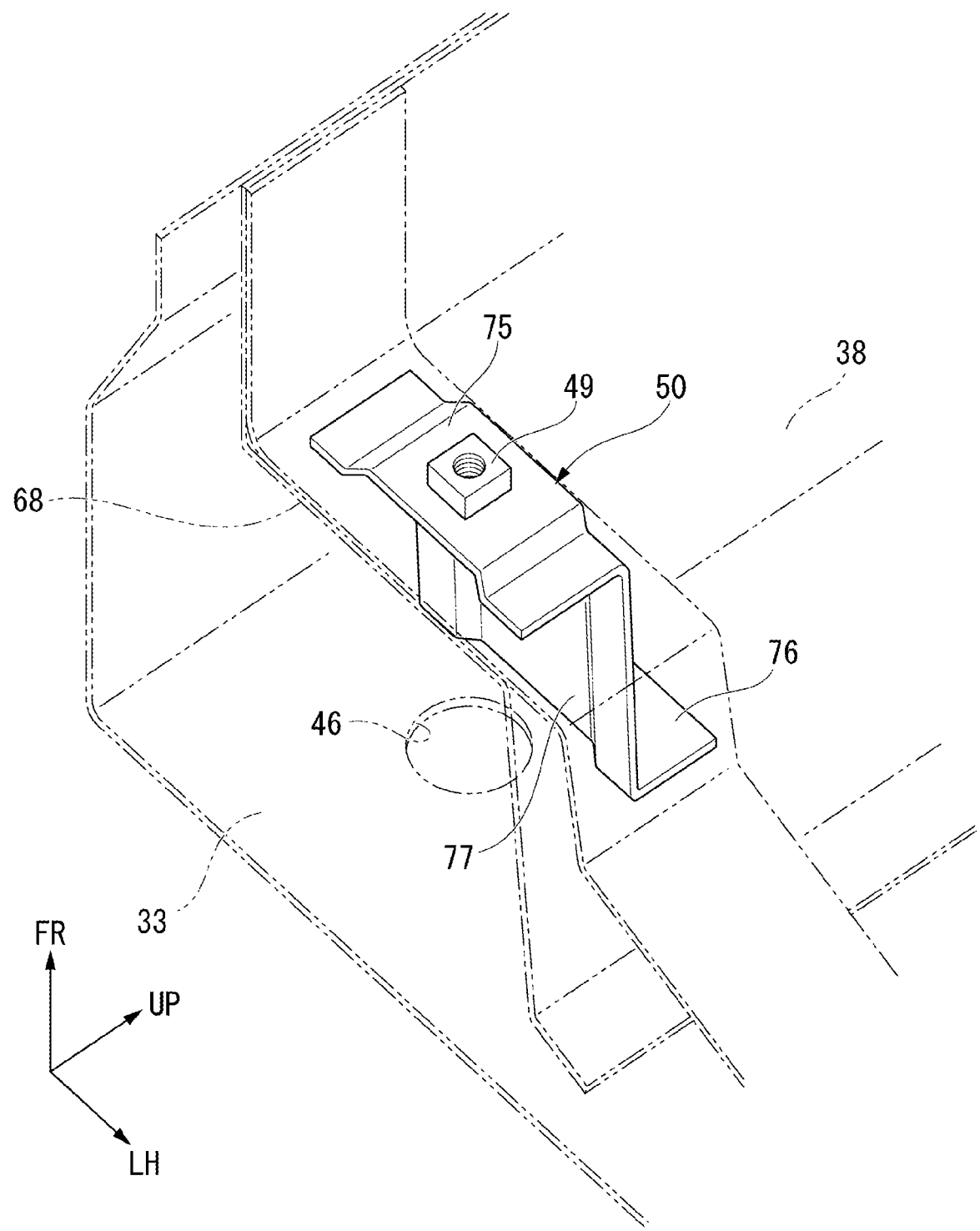
FIG. 11 is a perspective view showing a first bulkhead of a fourth embodiment according to the present invention.

As shown in FIG. 11, a first bulkhead 50 of a fourth embodiment is formed of a sheet of plate member in a crank shape as a first connecting section 75 is folded and bent downward from a front side of a wall section 77 and a second connecting section 76 is folded and bent upward from a rear side of the wall section 77.

That is, the first bulkhead 50 of the fourth embodiment is coupled to a first closed cross section 38 in a state in which the first bulkhead 50 of the first embodiment is rotated by 180° using a screw hole of a fastening nut 49 as an axis.

Accordingly, for example, a region to be reinforced by the foaming agent 85 (see FIG. 5) can be set on a side of the second closed cross section 68, and use of the first bulkhead 50 can be expanded.

Fifth Embodiment

Figure 12:
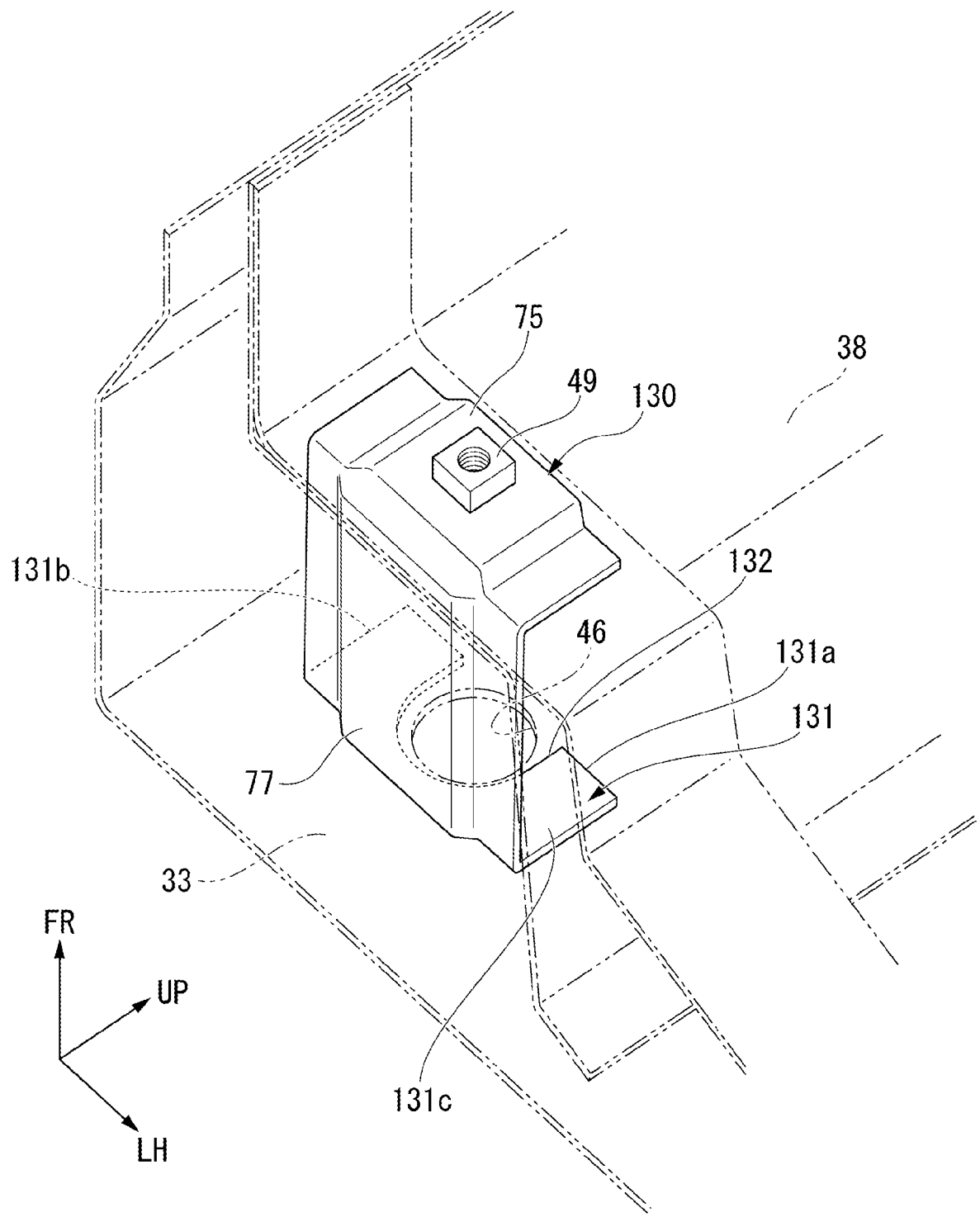
FIG. 12 is a perspective view showing a first bulkhead of a fifth embodiment according to the present invention.

As shown in FIG. 12, a first bulkhead (a bulkhead) 130 is formed of a sheet of plate member in a reversed C shape as a first connecting section 75 is folded and bent upward from a front side of a wall section 77 and a second connecting section 131 is folded and bent upward from a rear side of the wall section 77.

The second connecting section 131 is formed in, for example, a rectangular shape when seen in a plan view, and has a concave section 132 that opens on an upper side 131a. The second connecting section 131 is coupled to a panel front section 33 through spot welding or the like while avoiding an insertion hole 46 of a panel front section 33 due to the concave section 132.

In this way, by preparing the first bulkhead 130 formed in a reversed C shape, for example, the opening section of the insertion hole 46 can be coupled to and reinforced by the second connecting section 131 to be sandwiched between a vehicle interior side portion 131b and a vehicle exterior side portion 131c of the second connecting section 131. Accordingly, use of the first bulkhead 130 can be expanded.

Additionally, the present invention may be appropriately changed through substitution of the components in the above-mentioned embodiments with known components without departing from the scope of the present invention, and further, the above-mentioned variants may be appropriately combined.

For example, in the first embodiment to the fifth embodiment, while the example in which the side sill stiffener extension section 62 is provided on the rear end portion 12a of the side sill 12 has been described, the side sill stiffener extension section 62 may be provided on the front end portion of the side sill 12.

In addition, in the first embodiment to the fifth embodiment, while the example in which the first fastening member is used as the fastening nut 49 and the second fastening member is used as the fastening bolt 48 has been described, another fastening member such as a rivet or the like may be used as the first fastening member and the second fastening member.

In addition, in the second embodiment, while the example in which the distance L1 on the inward side in the vehicle width direction is inclined to be increased greater than the distance L2 on the outward side in the vehicle width direction in the area in which the side sill stiffener extension section 102 and the wheel arch reinforcement member 103 are coupled has been described, there is no limitation thereto. As another example, the distance L2 on the outward side in the vehicle width direction may be inclined to be greater than the distance L1 on the inward side in the vehicle width direction.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body side structure comprising:
    a side sill stiffener having a side sill stiffener extension section extending upward at an end portion of a side sill;
    a wheel arch reinforcement member coupled to an upper end portion of the side sill stiffener extension section;
    an inner panel coupled to the wheel arch reinforcement member and configured to form a first closed cross section; and
    a bulkhead coupled to the side sill stiffener extension section and the wheel arch reinforcement member and configured to partition the first closed cross section.

2. The vehicle body side structure according to claim 1, wherein the first closed cross section is coupled so as to be continuous with a second closed cross section of the side sill constituted by the side sill stiffener and the inner panel.

3. The vehicle body side structure according to claim 1, wherein the bulkhead has:
    a first connecting section coupled to the wheel arch reinforcement member and the side sill stiffener extension section;
    a second connecting section coupled to the inner panel; and
    a wall section configured to connect the first connecting section and the second connecting section and having a bead extending toward the first connecting section and the second connecting section.

4. The vehicle body side structure according to claim 3, comprising:
    a side panel outer member configured to cover the side sill stiffener from a side outward of a vehicle;
    a first fastening member provided in the side sill stiffener extension section on a side closer to the side panel outer member; and
    a second fastening member fastened to the first fastening member in the first closed cross section through an insertion hole formed in a portion of the inner panel corresponding to the first fastening member.

5. The vehicle body side structure according to claim 4, comprising a hole closing member configured to close the insertion hole.

6. The vehicle body side structure according to claim 1, wherein a portion to which the side sill stiffener extension section and the wheel arch reinforcement member are coupled is inclined in a vehicle width direction such that a first distance with respect to the inner panel at one of an outward side or an inward side of the portion to which the side sill stiffener extension section and the wheel arch reinforcement member are coupled in the vehicle width direction is greater than a second distance with respect to the inner panel at the other one of the outward side or the inward side of the portion to which the side sill stiffener extension section and the wheel arch reinforcement member are coupled in the vehicle width direction.

7. The vehicle body side structure according to claim 4, wherein the wall section is provided below the insertion hole, and
    a cavity between the first closed cross section and the wall section is set to be smaller than the second fastening member.

8. The vehicle body side structure according to claim 4, wherein the wall section is provided below the insertion hole and is provided on the first connecting section at a side in which the first closed cross section has a larger region, and
    comprises a foaming agent filled into the first closed cross section from the insertion hole.

9. The vehicle body side structure according to claim 4, wherein, at a portion in which the side sill stiffener extension section and the wheel arch reinforcement member are coupled,
    the first connecting section, the wheel arch reinforcement member and the side sill stiffener extension section are coupled by the first fastening member and the second fastening member in at least two places in the vehicle width direction.

* * * * *